United States Patent
Jain et al.

(10) Patent No.: US 12,537,755 B2
(45) Date of Patent: Jan. 27, 2026

(54) SYSTEMS AND METHODS FOR GENERATING IDENTIFIERS WITH A LOW LIKELIHOOD OF COLLISIONS FOR A PROLONGED TIME DURATION

(71) Applicant: Capital One Services, LLC, McLean, VA (US)

(72) Inventors: Parag Jain, Falls Church, VA (US); Sheldon Marshall, Vienna, VA (US); Rishab Mitra, New York, NY (US); Rakesh Gupta, Gainesville, VA (US); Bharath Mogali, Centreville, VA (US); Anirudha Simha, Ashburn, VA (US); Dean Foster, Rockville, MD (US); Brett Latour, Sterling, VA (US); Shashwat Rastogi, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 100 days.

(21) Appl. No.: 18/453,829

(22) Filed: Aug. 22, 2023

(65) Prior Publication Data
US 2025/0071042 A1    Feb. 27, 2025

(51) Int. Cl.
H04L 43/106    (2022.01)
H04L 43/16     (2022.01)

(52) U.S. Cl.
CPC .......... *H04L 43/106* (2013.01); *H04L 43/16* (2013.01)

(58) Field of Classification Search
CPC ................ H04L 43/106; H04L 43/16
USPC .................................................. 707/694
See application file for complete search history.

(56) References Cited

U.S. PATENT DOCUMENTS

| | | | |
|---|---|---|---|
| 2006/0184790 A1* | 8/2006 | Oliveira | H04N 21/23476 713/160 |
| 2010/0183035 A1* | 7/2010 | Li | H04L 43/106 370/503 |
| 2013/0047057 A1* | 2/2013 | Resch | H04L 9/0869 714/799 |
| 2014/0215120 A1* | 7/2014 | Saylor | H04L 9/0662 711/104 |
| 2022/0138175 A1* | 5/2022 | Mahendra Kumar | G06F 16/2365 707/694 |

* cited by examiner

*Primary Examiner* — Giovanna B Colan
(74) *Attorney, Agent, or Firm* — Harrity & Harrity, LLP (57) ABSTRACT

Some implementations described herein relate to a system for generating identifiers. The system receives, from a device, a request to generate a plurality of identifiers. The system determines, based on receiving the request and by performing a parameter locking operation, a compute region parameter associated and a timestamp parameter. The system generates, based on the compute region parameter and the timestamp parameter, a set of one or more identifiers of the plurality of identifiers. Respective portions of each identifier, of the set of one or more identifiers, may indicate the compute region parameter, a version parameter associated with the parameter locking operation, the timestamp parameter, a counter value parameter, and an action parameter. The system processes, using a scrambling technique, the set of one or more identifiers and provides the set of one or more identifiers to the device.

20 Claims, 5 Drawing Sheets

410 — Receive a request to generate a plurality of identifiers

420 — Perform a parameter locking operation to determine a compute region parameter and a timestamp parameter 430 — Generate a set of one or more identifiers of the plurality of identifiers 440 — Generate, using a scrambling technique, a processed set of one or more identifiers 450 — Provide the processed set of one or more identifiers to the device

FIG. 4

SYSTEMS AND METHODS FOR GENERATING IDENTIFIERS WITH A LOW LIKELIHOOD OF COLLISIONS FOR A PROLONGED TIME DURATION

BACKGROUND

Identifier generation relies on algorithms or processes that produce identifiers based on particular rules or patterns. For example, a common practice is to use hashing algorithms to generate seemingly unique identifiers.

SUMMARY

Some implementations described herein relate to a system for generating identifiers. The system may include one or more memories and one or more processors communicatively coupled to the one or more memories. The one or more processors may be configured to receive, by a module of the system, and from a device, a request to generate a plurality of identifiers. The one or more processors may be configured to perform, using the module and based on receiving the request, a parameter locking operation to determine a compute region parameter associated with the module and a timestamp parameter associated with the request. The one or more processors may be configured to generate, using the module and based on the compute region parameter and the timestamp parameter, a set of one or more identifiers of the plurality of identifiers, wherein respective portions of each identifier, of the set of one or more identifiers, indicate the compute region parameter, a version parameter associated with the parameter locking operation, the timestamp parameter, a counter value parameter, and an action parameter. The one or more processors may be configured to generate, using the module and using a scrambling technique, a processed set of one or more identifiers. The one or more processors may be configured to provide, using the module and based on processing the set of one or more identifiers, the processed set of one or more identifiers to the device.

Some implementations described herein relate to a non-transitory computer-readable medium that stores a set of instructions. The set of instructions, when executed by one or more processors of a system for generating identifiers, may cause the system for generating identifiers to receive, from a device, a request to generate a plurality of identifiers. The set of instructions, when executed by one or more processors of the system for generating identifiers, may cause the system for generating identifiers to perform a parameter locking operation to determine a compute region parameter and a timestamp parameter based on receiving the request. The set of instructions, when executed by one or more processors of the system for generating identifiers, may cause the system for generating identifiers to generate, based on the compute region parameter and the timestamp parameter, a set of one or more identifiers of the plurality of identifiers. The set of instructions, when executed by one or more processors of the system for generating identifiers, may cause the system for generating identifiers to generate a processed set of one or more identifiers using a scrambling technique. The set of instructions, when executed by one or more processors of the system for generating identifiers, may cause the system for generating identifiers to provide the processed set of one or more identifiers to the device.

Some implementations described herein relate to a method. The method may include performing, by a system, based on receiving a request to generate a plurality of identifiers, a parameter locking operation to determine a compute region parameter associated with the system and a timestamp parameter associated with the request. The method may include generating, by the system and based on the compute region parameter and the timestamp parameter, a set of one or more identifiers of the plurality of identifiers. The method may include providing the set of one or more identifiers.

DETAILED DESCRIPTION

The following detailed description of example implementations refers to the accompanying drawings. The same reference numbers in different drawings may identify the same or similar elements.

Some implementations described herein enable generation of identifiers with a low likelihood (e.g., a zero, or nearly zero, percent chance) of collisions (e.g., of generating the same identifier more than once) for a prolonged time duration (e.g., a time period that spans years, decades, or more). As a result, identifiers generated as described herein do not need to be stored after a particular period of usability of the identifiers (e.g., after the identifiers have gone stale). For example, because there is a certain (or almost certain) likelihood that a new identifier, generated as described herein, is unique, there is no need to consult a database of previously generated identifiers to check whether the new identifier is unique. This therefore reduces an amount of memory (e.g., of a system that generates the identifiers) that would otherwise be needed to store identifiers, and therefore also reduces an amount of processing resources (e.g., of the system) that would otherwise be used to check a uniqueness of newly generated identifiers. Further, because the invention allows for identifiers to be quickly generated (e.g., by iterating a counter value, as described herein) and scrambled (e.g., using a bit-shifting operation), the invention supports high transaction per second (TPS) applications. Additionally, the invention supports unique identifiers of limited length (e.g., less than or equal to 29 characters), which allows the identifiers to be used in length-restricted communications, such as SMS messages.

An identifier is a label, name, or other value associated with a particular entity or object. When generating identifiers, it can be desirable for each identifier to be unique, ensuring that each identifier represents a distinct entity or object. However, due to various factors such as a limited length of identifiers (e.g., in terms of a number of bits) or a large number of entities or objects, collisions can occur. A collision occurs when two or more identifiers are generated that are the same (e.g., have a same value, such as having a same bit string). For example, a collision can occur when hashing algorithms, used in association with two different entities or objects, generate a same hash value. This can be problematic because it can lead to ambiguity or confusion when referring to or identifying these entities or objects. In some cases, it can result in data integrity issues or errors in system functionality.

To mitigate collisions, various techniques can be used. One approach is to use longer identifiers or hashing algorithms with a larger output space, which reduces the probability of collisions. However, this is often not practical, such as when identifiers are limited to a particular length. In another approach, an identifier can incorporate a counter value to ensure uniqueness, but issues associated with identifier length remain, and a risk of the counter value being reset (e.g., due to a software upgrade or a migration to a new database) threatens the uniqueness of any newly generated identifiers. Further, identifiers that include incremented counter values are at high risk of being impersonated or exploited by a bad actor.

Some implementations described herein include a system. The system generates identifiers using a parameter locking operation, which allows the system (e.g., using a module of the system) to generate identifiers associated with a "locked" timestamp, which is indicated by a timestamp parameter, and a compute region parameter. The system then generates identifiers based on iterating a counter value. Notably, because of the parameter locking operation, no other module of the system (or any other system or device) can generate identifiers in association with the same locked timestamp and compute region parameter, so the identifiers generated by the system are unique with respect to other identifiers and to each other (e.g., because they are based on an iterated counter value). The parameter locking operation therefore enables generation of identifiers with a low likelihood of collisions for a prolonged time duration. Further, the system may process the identifiers (e.g., using a scrambling technique) to conceal, or otherwise disguise, the fact that the identifiers are generated by incrementing a counter value. This allows the identifiers to be generated quickly (e.g., based on incrementing the counter value), while also mitigating risks of imitation or exploitation that would otherwise be present (e.g., because the identifiers are scrambled).

In some implementations, the system may provide the identifiers so that the identifiers may be used as uniform resource locator (URL) slugs. In contrast to URL shortening services, which generate pseudo-random shortened URLs based on input URLs, the system ensures a perpetual uniqueness of the URL slugs for a prolonged time duration (e.g., without having to check a database of previously generated URLs) and does not require a URL redirect process (e.g., because direct URLs are generated, as opposed to shortened URLs that need to redirect to longer URLs). This enables the technical benefits described elsewhere herein, and also provides an improved user experience for a user that engages with a URL that includes a URL slug generated as described herein.

Figure 1A:
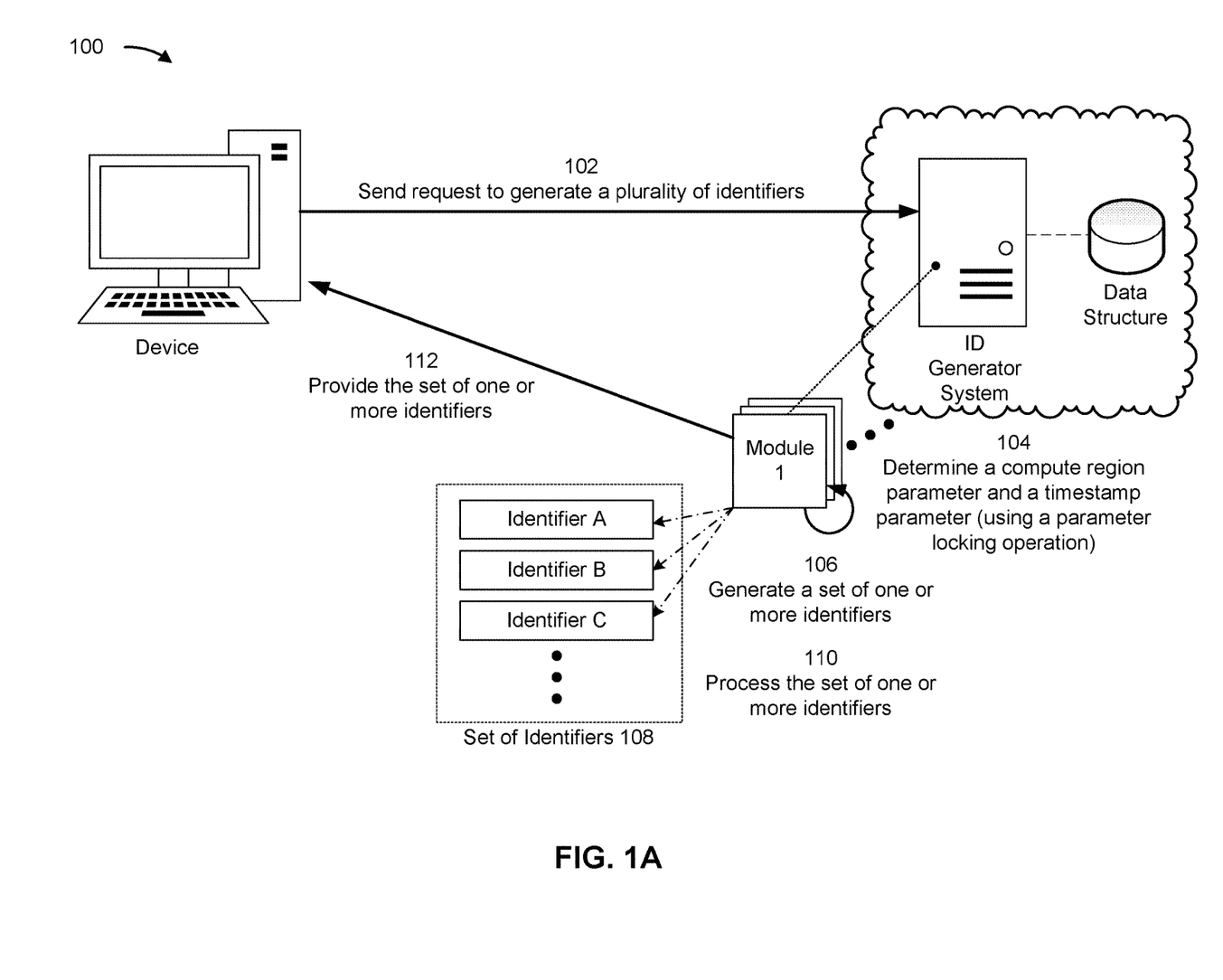
FIGS. 1A-1B are diagrams of an example associated with systems and methods for generating identifiers with a low likelihood of collisions for a prolonged time duration, in accordance with some embodiments of the present disclosure.
Figure 1B:
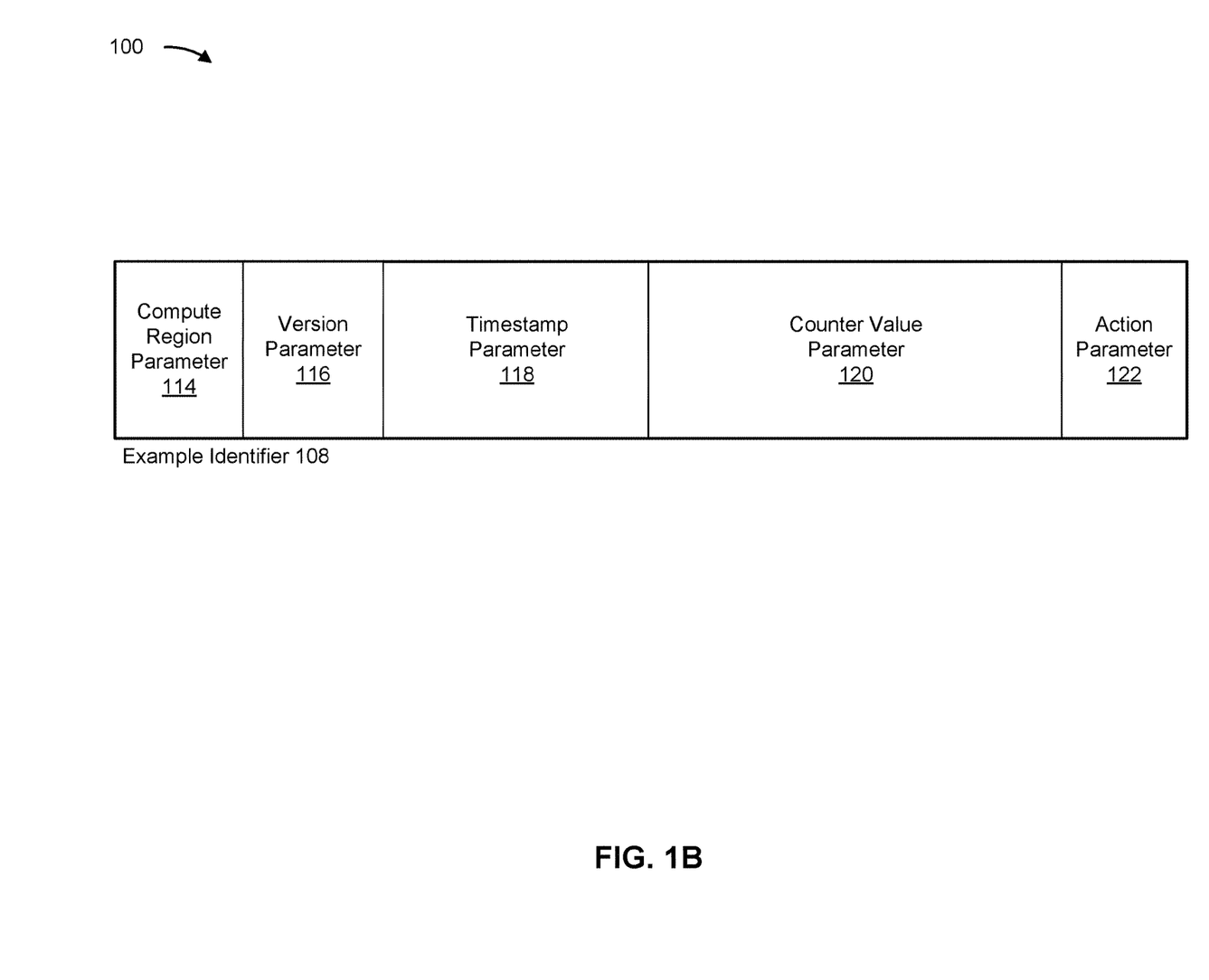

FIGS. 1A-1B are diagrams of an example 100 associated with systems and methods for generating identifiers with a low likelihood of collisions for a prolonged time duration. As shown in FIGS. 1A-1B, example 100 includes a device, an ID generator system, and a data structure. These devices are described in more detail in connection with FIGS. 2 and 3.

As shown in FIG. 1A, and by reference number 102, the device may send, to the ID generator system, a request to generate a plurality of identifiers. For example, the device may send the request to the ID generator system via a communication link between the device and the ID generator system, and the ID generator system may therefore receive the request from the device via the communication link. In some implementations, a module (shown as module 1), of one or more modules of the ID generator system, may receive the request. Each module may be configured to process a request. For example, each module may be a "worker" module that is configured to generate a plurality of identifiers (e.g., in response to a request). Accordingly, the module that receives the request from the device may thereby generate a plurality of identifiers, as described herein.

As shown by reference number 104, the ID generator system (e.g., using the module), may determine a compute region parameter and a timestamp parameter. The compute region parameter may be associated with the module. For example, the compute region parameter may indicate a computing environment of the module and/or the ID generator system, a physical location of the module and/or the ID generator system, or any other information that identifies the module and/or the ID generator system within a distributed computing environment. The timestamp parameter may be associated with the request. For example, the timestamp parameter may indicate a locked timestamp that is associated with generation of a set of one or more identifiers, of the plurality of identifiers, by the ID generator system (e.g., using the module), as described herein.

In some implementations, as further shown by the reference number 104, the ID generator system (e.g., using the module) may determine the compute region parameter and/or the timestamp parameter by performing a parameter locking operation. As part of the parameter locking operation, the ID generator system (e.g., using the module) may process (e.g., parse and/or read) configuration information (e.g., that is accessible to the module and/or the ID generator system) to determine the compute region parameter. Additionally, or alternatively, the ID generator system (e.g., using the module) may process the configuration information to determine a counter value (e.g., that is associated with the ID generator system and/or the module). The counter value may indicate, for example, a number of identifiers that the ID generator system (e.g., using the module) has generated (e.g., since the counter value has been reset, as described herein). Further, the ID generator system (e.g., using the module) may process the configuration information to determine the locked timestamp, a time threshold, and/or a maximum counter value, further described herein.

Further, as part of the parameter locking operation, the ID generator system (e.g., using the module) may identify a reception timestamp that indicates when the ID generator system (e.g., the module of the ID generator system) received the request. The reception timestamp, as well as the locked timestamp, or any other timestamp described herein, may indicate an amount of time (e.g., in second, milliseconds, or another amount of time) that has passed since a time epoch. The epoch may be, for example, 12:00 AM on Jan. 1, 2023.

Accordingly, the ID generator system (e.g., using the module) may determine whether the reception timestamp is within a time threshold of the locked timestamp (e.g., whether a difference between the reception timestamp and the locked timestamp is less than or equal to the time threshold). The locked timestamp may indicate a unique time (e.g., a unique start time) at which the ID generator system (e.g., using the module) is authorized to generate identifiers. Additionally, or alternatively, the ID generator system (e.g., using the module) may determine whether the counter value is less than the locked maximum counter value. The locked maximum counter value may indicate a maximum number of identifiers the ID generator system (e.g., using the module) may generate in association with the locked timestamp. Accordingly, the ID generator system (e.g., using the module) may determine that the reception timestamp is within the time threshold of the locked timestamp and that the counter value is less than the locked maximum counter value, and may thereby determine the timestamp parameter. For example, the ID generator system may cause the timestamp parameter to indicate the locked timestamp.

Alternatively, the ID generator system (e.g., using the module) may determine that the reception timestamp is not within the time threshold of the locked timestamp (e.g., a difference between the reception timestamp and the locked timestamp is greater than the time threshold) and/or that the counter value is not less than the locked maximum counter value, and may thereby cause the locked timestamp to be updated. In some implementations, to cause the locked timestamp to be updated, the ID generator system (e.g., using the module) may communicate (e.g., based on the compute region parameter and the reception timestamp) with the data structure (e.g., that is included in, and/or accessible to, the ID generator system) to cause the data structure to indicate a new timestamp. The new timestamp may be, for example, greater than or equal to the reception timestamp. In some implementations, the ID generator system (e.g., using the module) may communicate with the data structure to attempt to cause the data structure to include an entry that includes the compute region parameter and the reception timestamp. When an entry that includes the compute region parameter and the reception timestamp already exists in the data structure (e.g., thereby indicating that another module of the system has a locked timestamp associated with the reception timestamp), the ID generator system (e.g., using the module) may continue communicating (e.g., by incrementally increasing the reception timestamp by a particular time amount) with the data structure to cause the data structure to indicate a new timestamp (e.g., to include an entry that includes the compute region parameter and the incrementally increased reception timestamp). Accordingly, the ID generator system (e.g., using the module) may cause the locked timestamp to be updated to indicate the new timestamp, and may thereby determine the timestamp parameter. For example, the ID generator system may cause the timestamp parameter to indicate the locked timestamp (e.g., after the locked timestamp is updated).

In some implementations, the ID generator system (e.g., using the module) may determine that the reception timestamp is not within the time threshold of the locked timestamp (e.g., a difference between the reception timestamp and the locked timestamp is greater than the time threshold) and/or that the counter value is not less than the locked maximum counter value, and may thereby cause the counter value to be reset (e.g., in association with or based on causing the locked timestamp to be updated). For example, the ID generator system (e.g., using the module) may cause the counter value to indicate 0 (zero).

As further shown in FIG. 1A, and by reference number 106, the ID generator system (e.g., using the module) may generate a set of one or more identifiers of the plurality of identifiers (e.g., that are requested by the device). As an example, as shown in FIG. 1A, the ID generator system (e.g., using the module) may generate the set of identifiers 108, which includes a plurality of identifiers A, B, C, and so on. Respective portions of each identifier, of the set of one or more identifiers, may indicate the compute region parameter, a version parameter associated with the parameter locking operation, the timestamp parameter, a counter value parameter, and/or an action parameter, among other examples. Each identifier of the set of one or more identifiers (e.g., each identifier 108) is further described herein in relation to FIG. 1B.

To generate an identifier, of the set of one or more identifiers, the ID generator system (e.g., using the module) may identify the counter value (e.g., that is associated with the ID generator system and/or the module). Accordingly, the ID generator system (e.g., using the module) may cause a counter value parameter to indicate the counter value, and may generate the identifier to include a portion that indicates the counter value parameter. The ID generator system (e.g., using the module) may then cause the counter value to be incremented (e.g., based on generating the identifier). In this way, the ID generator system (e.g., using the module) may generate the set of one or more identifiers by causing the counter value parameter to be incrementally increased.

In some implementations, when generating the one or more identifiers, the ID generator system (e.g., using the module) may cause the counter value to be increased such that the counter value is greater than or equal to the locked maximum counter value. Accordingly, the ID generator system (e.g., using the module) may perform, again, the parameter locking operation described herein in relation to reference number 104 to determine the compute region parameter and another timestamp parameter associated with the request. In this way, the ID generator system may cause the locked timestamp to be updated and the counter value to be reset, which allows the ID generator system to generate another set of one or more identifiers of the plurality of identifiers. If needed, the ID generator system may continually repeat the same process until the plurality of identifiers are generated.

As shown by reference number 110, the ID generator system (e.g., using the module) may process the set of one or more identifiers. In some implementations, the ID generator system (e.g., using the module) may process the set of one or more identifiers using a scrambling technique. For example, the ID generator system (e.g., using the module) may cause an identifier, of the set of one or more identifiers, to be bit shifted. In this way, the ID generator system may generate a processed set of one or more identifiers. Accordingly, the ID generator system (e.g., using the module) may conceal, or otherwise disguise, the fact that respective portions of the set of one or more identifiers are generated by incrementing the counter value.

As shown by reference number 112, the ID generator system (e.g., using the module) may provide (e.g., to the device) the set of one or more identifiers (e.g., the processed set of one or more identifiers). For example, the ID generator system (e.g., using the module) may send the set of one or more identifiers to the device via the communication link between the device and the ID generator system, and the device may therefore receive the set of one or more identifiers from the ID generator system (e.g., the module of the ID generator system) via the communication link.

In some implementations, the ID generator system (e.g., using the module) may cause the one or more identifiers to be encoded (e.g., based on an encoding scheme, such as a hexadecimal encoding scheme, a base62 encoding scheme, or another encoding scheme). The ID generator system (e.g., using the module) then may send the set of one or more identifiers to the device (e.g., based on causing the set of one or more identifiers to be encoded).

In some implementations, each identifier, of the set of one or more identifiers, is provided to the device to allow the identifier to be used as a URL slug (e.g., as a suffix to a domain name or subfolder included in the URL). For example, each identifier may be used to uniquely identify a URL.

While the operations described herein in association with reference numbers 110-112 are directed to a single set of one or more identifiers, some implementations also include the ID generator system (e.g., using the module) performing the same or similar operations in association with additional sets of the one or more identifiers (e.g., that are generated after repeatedly causing the locked timestamp to be updated and the counter value to be reset, as described herein in relation to reference number 106). In this way, the ID generator system may process and/or provide the plurality of identifiers (e.g., that are requested by the device).

FIG. 1B shows an example identifier 108 of the set of identifiers 108 described herein. As shown in FIG. 1B, the identifier 108 may include a plurality of portions, such as a first portion that indicates a compute region parameter 114 (e.g., that is determined by the ID generator system, such as described herein in relation to reference number 104), a second portion that indicates a version parameter 116 associated with the parameter locking operation (e.g., that identifies particular version information associated with the parameter locking operation), a third portion that indicates a timestamp parameter 118 (e.g., that is determined by the ID generator system, such as described herein in relation to reference number 104), a fourth portion that indicates a counter value parameter 120 (e.g., that indicates a counter value, such as described herein in relation to reference number 106), and a fifth portion that indicates an action parameter 122 (e.g., that indicates one or more actions, such as one or more URL actions). Each portion, of the plurality of portions, may have a particular width. For example, a width of the first portion may be from 1 to 2 bits (e.g., greater than or equal to 1 bit and less than or equal to 2 bits), a width of the second portion may be from 1 to 3 bits, a width of the third portion may be from 41 to 45 bits, a width of the fourth portion may be from 19 to 69 bits, and a width of the fifth portion may be from 1 to 2 characters.

As indicated above, FIGS. 1A-1B are provided as an example. Other examples may differ from what is described with regard to FIGS. 1A-1B.

Figure 2:
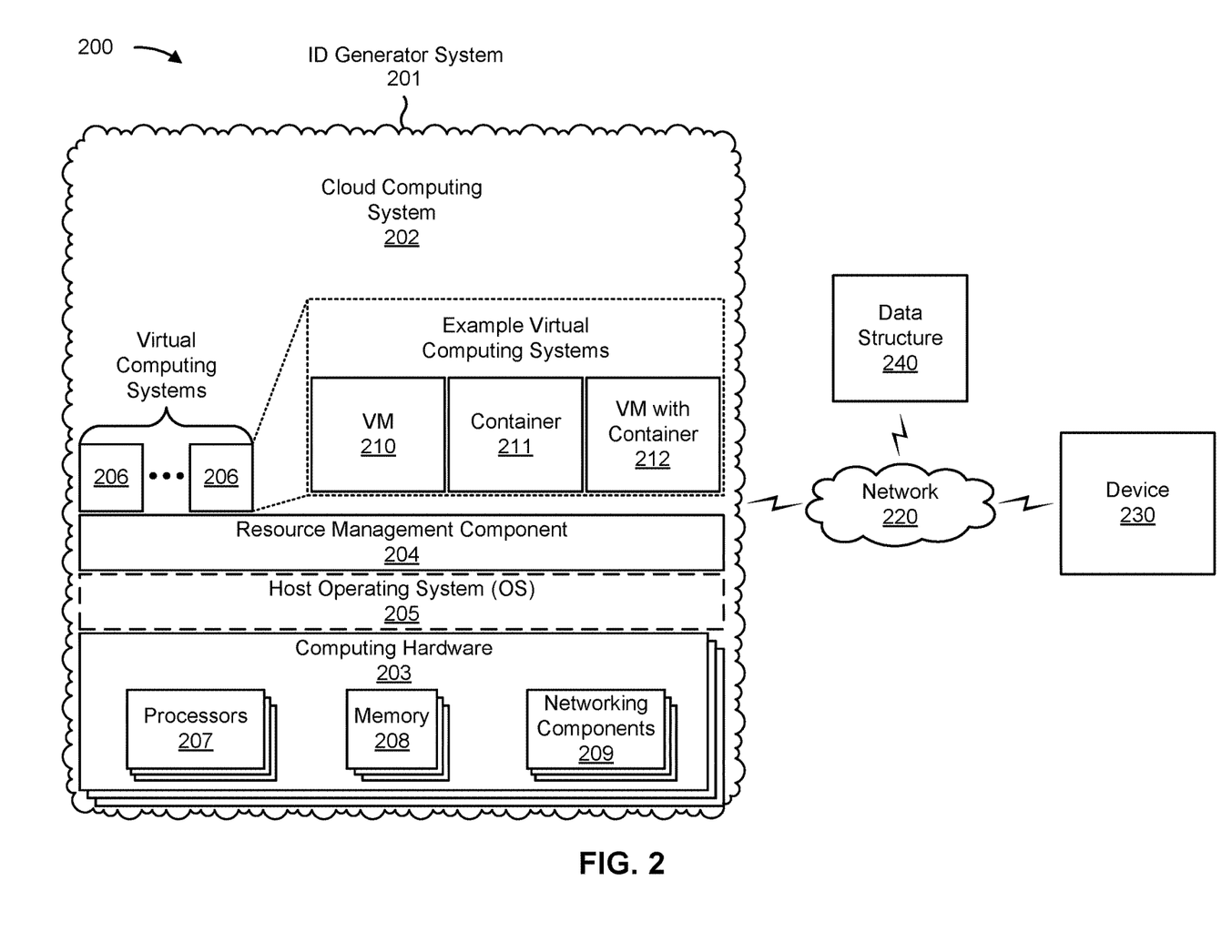
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a ID generator system 201, which may include one or more elements of and/or may execute within a cloud computing system 202. The cloud computing system 202 may include one or more elements 203-212, as described in more detail below. As further shown in FIG. 2, environment 200 may include a network 220, a device 230, and/or a data structure 240. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the ID generator system 201 may include one or more elements 203-212 of the cloud computing system 202, may execute within the cloud computing system 202, and/or may be hosted within the cloud computing system 202, in some implementations, the ID generator system 201 may not be cloud-based (e.g., may be implemented outside of a cloud computing system) or may be partially cloud-based. For example, the ID generator system 201 may include one or more devices that are not part of the cloud computing system 202, such as device 300 of FIG. 3, which may include a standalone server or another type of computing device. The ID generator system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The device 230 may include one or more devices capable of receiving, generating, storing, processing, and/or providing information associated with generating identifiers, as described elsewhere herein. The device 230 may include a communication device and/or a computing device. For example, the device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. As another example, device 230 may include a server, such as an application server, a client server, a web server, a database server, a host server, a proxy server, a virtual server (e.g., executing on computing hardware), or a server in a cloud computing system. In some implementations, the device 230 may include computing hardware used in a cloud computing environment.

The data structure 240 may include one or more devices capable of receiving, generating, storing, processing, and/or providing information associated with generating identifiers, as described elsewhere herein. The data structure 240 may include a communication device and/or a computing device. For example, the data structure 240 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the data structure 240 may store compute region parameters and timestamps, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
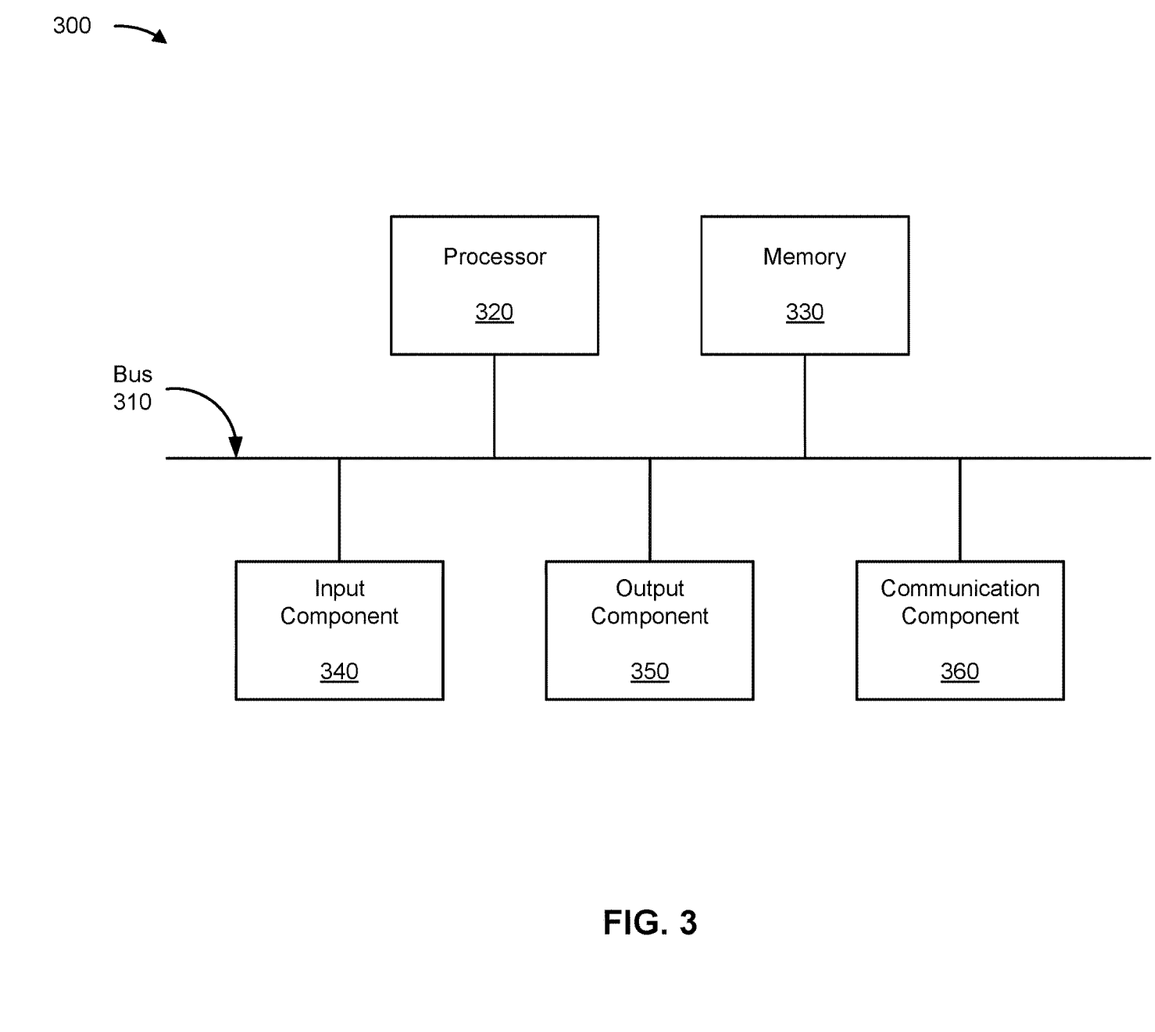
FIG. 3 is a diagram of example components of a device associated with generating identifiers with a low likelihood of collisions for a prolonged time duration, in accordance with some embodiments of the present disclosure.

FIG. 3 is a diagram of example components of a device 300 associated with generating identifiers with a low likelihood of collisions for a prolonged time duration. The device 300 may correspond to the ID generator system 201, the computing hardware 203, the device 230, and/or the data structure 240. In some implementations, the ID generator system 201, the computing hardware 203, the device 230, and/or the data structure 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
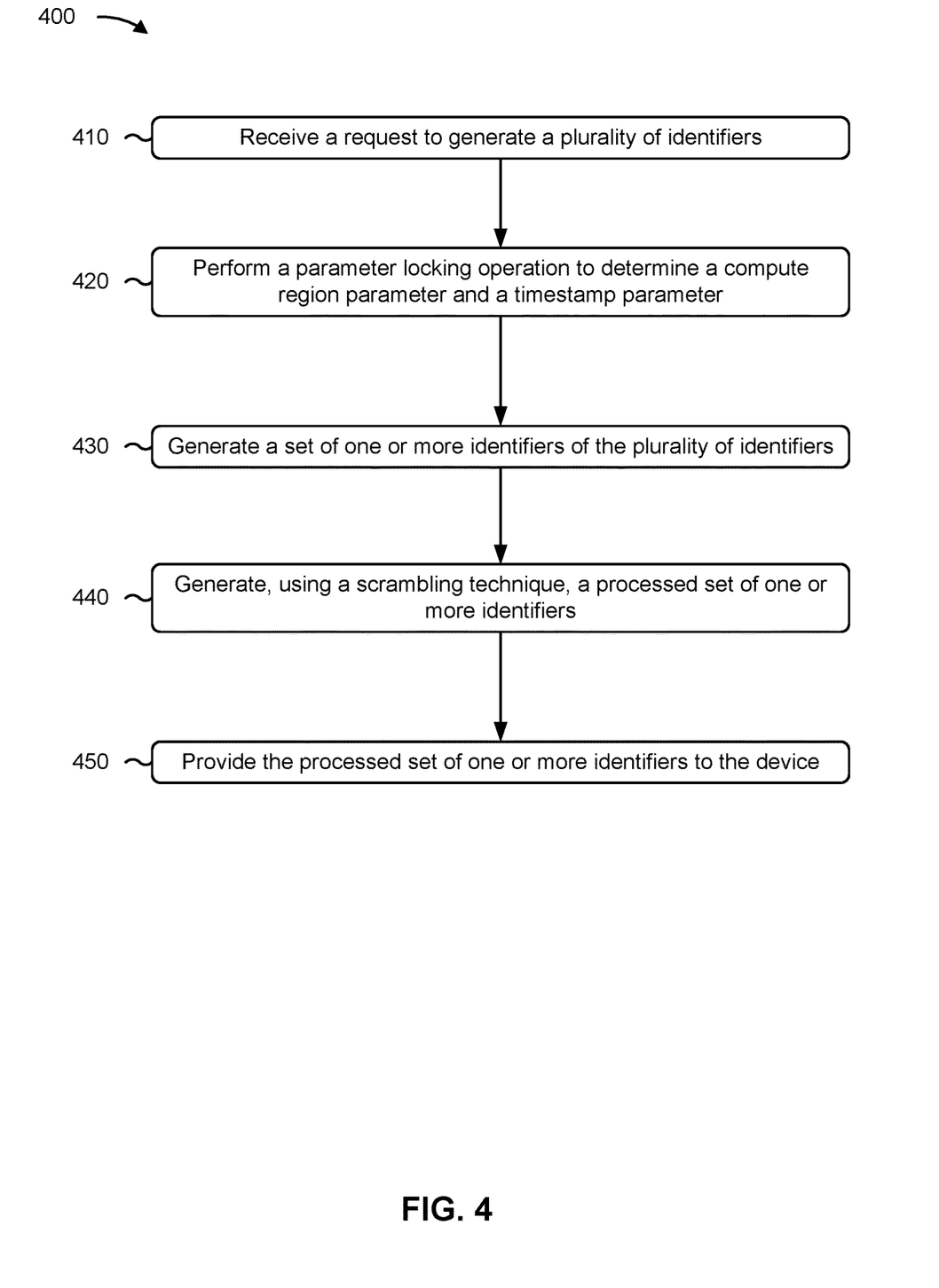
FIG. 4 is a flowchart of an example process associated with systems and methods for generating identifiers with a low likelihood of collisions for a prolonged time duration, in accordance with some embodiments of the present disclosure.

FIG. 4 is a flowchart of an example process 400 associated with systems and methods for generating identifiers with a low likelihood of collisions for a prolonged time duration. In some implementations, one or more process blocks of FIG. 4 may be performed by the ID generator system 201 (e.g., using a module of the ID generator system 201). In some implementations, one or more process blocks of FIG. 4 may be performed by another device or a group of devices separate from or including the ID generator system 201, such as the computing hardware 203, the device 230, and/or the data structure 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a request to generate a plurality of identifiers (block 410). For example, the ID generator system 201 (e.g., using processor 320, memory 330, input component 340, and/or communication component 360) may receive, from a device, a request to generate a plurality of identifiers, as described above in connection with reference number 102 of FIG. 1A. As an example, the device may send the request to enable the device to provide URLs with unique URL slugs.

As further shown in FIG. 4, process 400 may include performing a parameter locking operation to determine a compute region parameter and a timestamp parameter (block 420). For example, the ID generator system 201 (e.g., using processor 320 and/or memory 330) may perform, based on receiving the request, a parameter locking operation to determine a compute region parameter associated with the module and a timestamp parameter associated with the request, as described above in connection with reference number 104 of FIG. 1A. As an example, the ID generator system 201, as part of the parameter locking operation, may process configuration information and/or communicate with a data structure to determine the compute region parameter and the timestamp parameter.

As further shown in FIG. 4, process 400 may include generating a set of one or more identifiers of the plurality of identifiers (block 430). For example, the ID generator system 201 (e.g., using processor 320 and/or memory 330) may generate, based on the compute region parameter and the timestamp parameter, a set of one or more identifiers of the plurality of identifiers, as described above in connection with reference number 106 of FIG. 1A. As an example, the ID generator system 201 may generate the set of identifiers shown in FIG. 1A. In some implementations, respective portions of each identifier, of the set of one or more identifiers, indicate the compute region parameter, a version parameter associated with the parameter locking operation, the timestamp parameter, a counter value parameter, and an action parameter, such as shown in FIG. 1B.

As further shown in FIG. 4, process 400 may include generating, using a scrambling technique, a processed set of one or more identifiers (block 440). For example, the ID generator system 201 (e.g., using processor 320 and/or memory 330) may generate, using a scrambling technique, a processed set of one or more identifiers, as described above in connection with reference number 110 of FIG. 1A. As an example, the ID generator system 201 may cause the set of one or more identifiers to be bit shifted to generate the processed set of one or more identifiers.

As further shown in FIG. 4, process 400 may include providing the processed set of one or more identifiers to the device (block 450). For example, the ID generator system 201 (e.g., using processor 320 and/or memory 330) may provide the processed set of one or more identifiers to the device, as described above in connection with reference number 112 of FIG. 1A. As an example, the ID generator system 201 may send the processed set of one or more identifiers to the device to allow the processed set of one or more identifiers to be used as URL slugs.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for generating identifiers, the system comprising:
   one or more memories; and
   one or more processors, communicatively coupled to the one or more memories, configured to:
      receive, by a module of the system, and from a device, a request to generate a plurality of identifiers;
      determine, based on performing a parameter locking operation using the module and based on receiving the request, a compute region parameter associated with the module and a timestamp parameter associated with the request,
         wherein the timestamp parameter is associated with a locked timestamp that indicates a start time at which the system is authorized to generate identifiers using the module;
      generate, using the module and based on the compute region parameter and the timestamp parameter, a set of one or more identifiers of the plurality of identifiers,
         wherein respective portions of each identifier, of the set of one or more identifiers, indicate the compute region parameter, a version parameter associated with the parameter locking operation, the timestamp parameter, a counter value parameter, and an action parameter;
      generate, using the module and using a scrambling technique, a processed set of one or more identifiers; and
      provide, using the module and based on processing the set of one or more identifiers, the processed set of one or more identifiers to the device.

2. The system of claim 1, wherein the one or more processors, to determine the compute region parameter and the timestamp parameter, are configured to:
   determine, using the module and based on configuration information, the compute region parameter and a counter value associated with the module;
   identify, using the module and based on the request, a reception timestamp that indicates when the module received the request;
   determine, using the module, that the reception timestamp is within a time threshold of the locked timestamp and that the counter value is less than a locked maximum counter value; and
   determine, using the module and based on determining that the reception timestamp is within the time threshold of the locked timestamp and that the counter value is less than the locked maximum counter value, the timestamp parameter.

3. The system of claim 1, wherein the one or more processors, to determine the compute region parameter and the timestamp parameter, are configured to:
   determine, using the module and based on configuration information, the compute region parameter and a counter value associated with the module;
   identify, using the module and based on the request, a reception timestamp that indicates when the module received the request;
   determine, using the module, that:
      the reception timestamp is not within a time threshold of the locked timestamp, or
      the counter value is not less than a locked maximum counter value;
   cause, using the module and based on determining that the reception timestamp is not within the time threshold of the locked timestamp, or that the counter value is not less than the locked maximum counter value, the locked timestamp to be updated;
   cause, using the module and based on causing the locked timestamp to be updated, the counter value to be reset; and determine, using the module and based on causing the locked timestamp to be updated, the timestamp parameter.

4. The system of claim 3, wherein the one or more processors, to cause the locked timestamp to be updated, are configured to:
communicate, using the module and based on the compute region parameter and the reception timestamp, with a data structure to cause the data structure to indicate a new timestamp,
wherein the new timestamp is greater than or equal to the reception timestamp; and
cause the locked timestamp to be updated to indicate the new timestamp.

5. The system of claim 1,
wherein the one or more processors, to generate the set of one or more identifiers, are configured to:
identify, using the module, a counter value associated with the module;
cause, using the module, the counter value parameter to indicate the counter value;
generate, using the module, an identifier, of the set of one or more identifiers, to include a portion that indicates the counter value parameter; and
cause, using the module and based on generating the identifier, the counter value to be incremented.

6. The system of claim 1,
wherein the one or more processors, to generate the processed set of one or more identifiers, are configured to:
cause, using the module, an identifier, of the set of one or more identifiers, to be bit shifted.

7. The system of claim 1,
wherein the one or more processors, to provide the processed set of one or more identifiers to the device, are configured to:
cause, using the module and based on an encoding scheme, the processed set of one or more identifiers to be encoded; and
send, using the module and based on causing the processed set of one or more identifiers to be encoded, the processed set of one or more identifiers to the device.

8. The system of claim 1,
wherein each identifier, of the processed set of one or more identifiers, is provided to the device to allow the identifier to be used as a uniform resource locator (URL) slug.

9. A non-transitory computer-readable medium storing a set of instructions, the set of instructions comprising:
one or more instructions that, when executed by one or more processors of a system for generating identifiers, cause the system to:
receive, from a device, a request to generate a plurality of identifiers;
determine, based on performing a parameter locking operation and based on receiving the request, a compute region parameter and a timestamp parameter,
wherein the timestamp parameter is associated with a locked timestamp that indicates a start time at which the system is authorized to generate identifiers;
generate, based on the compute region parameter and the timestamp parameter, a set of one or more identifiers of the plurality of identifiers, wherein respective portions of each identifier, of the set of one or more identifiers, indicate the compute region parameter, a version parameter associated with the parameter locking operation, the timestamp parameter, a counter value parameter, and an action parameter;
generate a processed set of one or more identifiers using a scrambling technique; and
provide the processed set of one or more identifiers to the device.

10. The non-transitory computer-readable medium of claim 9,
wherein the one or more instructions, that cause the system to determine the compute region parameter and the timestamp parameter, cause the system to:
determine, based on configuration information, the compute region parameter and a counter value;
identify, based on the request, a reception timestamp associated with the request;
determine that the reception timestamp is within a time threshold of the locked timestamp and that the counter value is less than a locked maximum counter value; and
determine, based on determining that the reception timestamp is within the time threshold of the locked timestamp and that the counter value is less than the locked maximum counter value, the timestamp parameter.

11. The non-transitory computer-readable medium of claim 9,
wherein the one or more instructions, that cause the system to determine the compute region parameter and the timestamp parameter, cause the system to:
determine, based on configuration information, the compute region parameter and a counter value;
identify, based on the request, a reception timestamp associated with the request;
determine that:
the reception timestamp is not within a time threshold of the locked timestamp, or
the counter value is not less than a locked maximum counter value;
cause, based on determining that the reception timestamp is not within the time threshold of the locked timestamp or that the counter value is not less than the locked maximum counter value, the locked timestamp to be updated and the counter value to be reset; and
determine, based on causing the locked timestamp to be updated, the timestamp parameter.

12. The non-transitory computer-readable medium of claim 11,
wherein the one or more processors, to cause the locked timestamp to be updated, are configured to:
communicate, based on the compute region parameter and the reception timestamp, with a data structure to cause the data structure to indicate a new timestamp,
wherein the new timestamp is greater than or equal to the reception timestamp; and
cause the locked timestamp to be updated to indicate the new timestamp.

13. The non-transitory computer-readable medium of claim 9,
wherein the one or more instructions, that cause the system to generate the set of one or more identifiers, cause the system to:
identify a counter value;

generate an identifier, of the set of one or more identifiers, to include a portion that indicates the counter value; and cause, based on generating the identifier, the counter value to be incremented.

14. The non-transitory computer-readable medium of claim 9,
wherein each identifier, of the set of one or more identifiers includes:
a first portion that indicates the compute region parameter;
a second portion that indicates the version parameter associated with the parameter locking operation;
a third portion that indicates the timestamp parameter;
a fourth portion that indicates the counter value parameter; and
a fifth portion that indicates the action parameter.

15. The non-transitory computer-readable medium of claim 14, wherein:
a width of the first portion is from 1 to 2 bits;
a width of the second portion is from 1 to 3 bits;
a width of the third portion is from 41 to 45 bits;
a width of the fourth portion is from 19 to 69 bits; and
a width of the fifth portion is from 1 to 2 characters.

16. A method, comprising:
determining, by a system, based on receiving a request to generate a plurality of identifiers and based on performing a parameter locking operation, a compute region parameter associated with the system and a timestamp parameter associated with the request,
wherein the timestamp parameter is associated with a locked timestamp that indicates a start time at which the system is authorized to generate identifiers;
generating, by the system and based on the compute region parameter and the timestamp parameter, a set of one or more identifiers of the plurality of identifiers, wherein respective portions of each identifier, of the set of one or more identifiers, indicate the compute region parameter, a version parameter associated with the parameter locking operation, the timestamp parameter, a counter value parameter, and an action parameter;
generating, by the system and using a scrambling technique, a processed set of one or more identifiers; and
providing, by the system and in response to the request, the processed set of one or more identifiers.

17. The method of claim 16,
wherein determining the compute region parameter and the timestamp parameter comprises:
determining, based on configuration information, the compute region parameter and a counter value;

identifying a reception timestamp that indicates when the system received the request;
determining that the reception timestamp is within a time threshold of the locked timestamp and that the counter value is less than a locked maximum counter value; and
determining, based on determining that the reception timestamp is within the time threshold of the locked timestamp and that the counter value is less than the locked maximum counter value, the timestamp parameter.

18. The method of claim 16,
wherein determining the compute region parameter and the timestamp parameter comprises:
determining, based on configuration information, the compute region parameter and a counter value;
identifying a reception timestamp that indicates when the system received the request;
determining that:
the reception timestamp is not within a time threshold of the locked timestamp, or
the counter value is not less than a locked maximum counter value;
causing, based on determining that the reception timestamp is not within the time threshold of the locked timestamp or that the counter value is not less than the locked maximum counter value, the locked timestamp to be updated and the counter value to be reset; and
determining, based on causing the locked timestamp to be updated, the timestamp parameter.

19. The method of claim 18,
wherein causing the locked timestamp to be updated comprises:
communicating, based on the compute region parameter and the reception timestamp, with a data structure to cause the data structure to indicate a new timestamp; and
causing the locked timestamp to be updated to indicate the new timestamp.

20. The method of claim 16,
wherein generating the set of one or more identifiers comprises:
generating an identifier, of the set of one or more identifiers, to include a portion that indicates a counter value; and
causing, based on generating the identifier, the counter value to be incremented.

* * * * *